(12) United States Patent
Nicholas et al.

(10) Patent No.: US 10,414,684 B2
(45) Date of Patent: Sep. 17, 2019

(54) BOTTLE CUTTER APPARATUS, SYSTEMS AND METHODS OF USING THE SAME

(71) Applicant: Creator's Stained Glass, Inc., Fox Lake, IL (US)

(72) Inventors: Ray Nicholas, Ingleside, IL (US); Jordan Anderson, Gurnee, IL (US); Ryan Nicholas, Ingleside, IL (US)

(73) Assignee: Creator's Stained Glass, Inc., Spring Grove, IL (US)

( * ) Notice: Subject to any disclaimer, the term of this patent is extended or adjusted under 35 U.S.C. 154(b) by 0 days.

(21) Appl. No.: 15/886,564

(22) Filed: Feb. 1, 2018

(65) Prior Publication Data
US 2019/0233320 A1 Aug. 1, 2019

(51) Int. Cl.
| | | |
|---|---|---|
| *B26D 1/30* | (2006.01) | |
| *C03B 33/06* | (2006.01) | |
| *B26D 1/01* | (2006.01) | |
| *B26D 3/08* | (2006.01) | |
| *C03B 33/10* | (2006.01) | |
| *B26D 3/16* | (2006.01) | |
| *B26D 7/01* | (2006.01) | |
| *B26D 1/00* | (2006.01) | |

(52) U.S. Cl.
CPC ............... *C03B 33/06* (2013.01); *B26D 1/01* (2013.01); *B26D 3/08* (2013.01); *B26D 3/16* (2013.01); *C03B 33/10* (2013.01); *B26D 2001/004* (2013.01); *B26D 2007/013* (2013.01)

(58) Field of Classification Search
CPC ........ Y10T 83/8814; B26D 1/30; B26D 3/08; B26D 3/16
See application file for complete search history.

(56) References Cited

U.S. PATENT DOCUMENTS

| | | | | |
|---|---|---|---|---|
| 3,084,431 A | * | 4/1963 | Steierman ............... | C03B 33/06 30/164.9 |
| 3,699,829 A | * | 10/1972 | Gelfman .................. | B26D 7/01 225/2 |
| 3,744,359 A | * | 7/1973 | Gelfman ................. | C03B 33/14 225/93.5 |
| 3,744,692 A | * | 7/1973 | Doyel ..................... | C03B 33/14 225/103 |
| 3,806,647 A | * | 4/1974 | Dohne .................. | H04L 1/0059 375/281 |
| 5,857,391 A | * | 1/1999 | Renstrom ........... | B65B 69/0033 414/25 |

(Continued)

OTHER PUBLICATIONS

Creator's Premium Bottle Cutter, <<https://www.amazon.com/Delphi-Glass-5438-Creators-Premium/dp/B00WX6J032>>.

(Continued)

*Primary Examiner* — Kenneth E Peterson
*Assistant Examiner* — Fernando A Ayala
(74) *Attorney, Agent, or Firm* — Scherrer Patent & Trademark Law, P.C.; Stephen T. Scherrer; Monique A. Morneault

(57) ABSTRACT

A bottle cutter apparatus, systems and methods of using the same are provided. Specifically, the bottle cutter apparatus comprises a stage for holding a bottle and a rotatable arm having a blade thereon for scoring a glass bottle, or any glass tubular item. The stage is modular and movable, thereby accommodating different sized bottles thereon for precise scoring with the arm and blade.

20 Claims, 9 Drawing Sheets

(56) References Cited

U.S. PATENT DOCUMENTS 5,899,133 A * 5/1999 Halladay ................. A47J 43/00
83/467.1
2016/0360930 A1* 12/2016 Johnson ................. A47J 47/005

OTHER PUBLICATIONS

Creator's Bottle Neck Cutter, <<https://www.amazon.com/Creators-Bottle-Machine-Abrasive-CBNC-USA/dp/B017T5KL7K/ref=sr_1_2?s=arts-crafts&ie=UTF8&qid=1523039723&sr=1-2&keywords=creator%27s+bottle+neck+cutter&dpID=41I75Oz6urL&preST=_SY300_QL70_&dpSrc=srch>>.

Ephrem's Bottle Cutter, <<https://www.amazon.com/Wine-Bottle-Cutter-Glass-Cutting/dp/B005NK2ZZ0/ref=sr_1_4?s=arts-crafts&ie=UTF8&qid=1523039841&sr=1-4&keywords=ephrem%27s+bottle+cutter&dpID=51v6PeHP9IL&preST=_SY300_QL70_&dpSrc=srch>>.

Generation Green Bottle Cutter, <<https://www.amazon.com/Bottle-Cutter-Generation-Recycles-Bottles/dp/B01LQSP932/ref=sr_1_3?s=arts-crafts&ie=UTF8&qid=1523041321&sr=1-3&keywords=generation+green+bottle+cutter&dpID=41ORgwYJgJL&preST=_SY300_QL70_&dpSrc=srch>>.

AceList Glass Bottle Scoring Machine Tool, <<https://www.amazon.com/AceList-Scoring-Machine-Cutting-Shorter/dp/B00WVZAATI>>.

AGPtek Bottle Cutter Machine, <<https://www.amazon.com/AGPtek-Bottle-Machine-Cutting-Bottles/dp/B0155WMTGU/ref=sr_1_1?s=home-garden&ie=UTF8&qid=1523042352&sr=8-1&keywords=agptek+bottle+cutter&dpID=41iZUEFMWcL&preST=_SY300_QL70_&dpSrc=srch>>.

The Kinkajou Bottle Cutter, <<https://www.amazon.com/Bottle-Cutting-Inc-NDE-KBC-BLACK-Cutter-Deep/dp/B00L1N371Y/ref=sr_1_4?ie=UTF8&qid=1523042489&sr=8-4&keywords=kinkajou+bottle+cutter&dpID=51BAdYVaRSL&preST=_SX300_QL70_&dpSrc=srch>>.

Diamond Tech Crafts Bottle Cutter, <<https://www.amazon.com/g2-Bottle-Cutter/dp/B07BBM3DRW/ref=sr_1_7?ie=UTF8&qid=1523042630&sr=8-7&keywords=diamond+tech+crafts+bottle+cutter&dpID=41zRckMdcUL&preST=_SY300_QL70_&dpSrc=srch>>.

CRL Toyo Original Supercutter, <<https://www.amazon.com/CRL-Original-Supercutter-Straight-Laurence/dp/B006JFPJ7Y/ref=sr_1_1?ie=UTF8&qid=1523042912&sr=8-1&keywords=CRL+TOYO+glass+cutter&dpID=61SQ4ET5JWL&preST=_SY300_QL70_&dpSrc=srch>>.

Red Devil 106730 DIY Glass Cutter, <<https://www.amazon.com/Red-Devil-106370-Glass-Cutter/dp/B00004YNNP/ref=sr_1_2?ie=UTF8&qid=1523043070&sr=8-2&keywords=Red+Devil+106370+glass+cutter&dpID=21EAGdZWrCL&preST=_SX300_QL70_&dpSrc=srch>>.

Genround Glass Bottle Cutter, <<https://www.amazon.com/Bottle-Cutter-Genround-Machine-Cutting/dp/B01EG6TP9A/ref=sr_1_3?ie=UTF8&qid=1523043173&sr=8-3&keywords=genround+bottle+cutter&dpID=4115CJ0rkYL&preST=_SY300_QL70_&dpSrc=srch>>.

VGCE Custom-Grip Supercutter, <<https://www.amazon.com/Custom-grip-Supercutter-Cutter-Assorted-Colors/dp/B00D9CDIAA/ref=sr_1_1?ie=UTF8&qid=1523043303&sr=8-1&keywords=VGCE+glass+cutter>>.

Toyo Pistol-Grip Glass Cutter, <<https://www.amazon.com/Toyo-Pistol-Grip-Glass-Cutter/dp/B000IGMQ1C/ref=sr_1_1?ie=UTF8&qid=1523043424&sr=8-1&keywords=toyo+pistol+grip+glass+cutter>>.

* cited by examiner

BOTTLE CUTTER APPARATUS, SYSTEMS AND METHODS OF USING THE SAME

TECHNICAL FIELD

The present invention relates to bottle cutter apparatuses, systems and methods of using the same. Specifically, the bottle cutter apparatuses comprise a stage module for holding a bottle and a cutting module comprising a rotatable arm having a blade thereon for scoring a glass bottle, or any glass tubular or cylindrical item. The stage module and the cutting module comprise elements that are movable, thereby accommodating different sized bottles thereon for precise scoring with the blade.

BACKGROUND

Bottle cutter apparatuses are known, but are difficult to use. There are many different techniques to cut a bottle, most involving a blade that scores the bottle circumferentially so that the same may be cracked, providing a clean separation at the score line. However, other techniques include using a hot wire or hot string in an attempt to break the bottle along a desired line. These techniques have proven to be difficult, and in many cases can be dangerous.

Specifically, the technique of wrapping a bottle with a hot wire or hot string is particularly difficult to produce a clean score line. In most cases, wrapping a hot wire or string around a bottle and attempting to crack along the string or wire leads to shattering of the bottle, which is, of course, very dangerous.

Another technique involves utilizing a high-speed spinning blade to score or cut a glass bottle. While this may be relatively quick and effective, the machines tend to be expensive and also dangerous in that the spinning blades could cause bodily damage. And if not properly used, the spinning blade can cause the bottle to break irregularly, also leading to a dangerous situation with glass shards.

The more common method to cut a bottle involves the afore-mentioned blade scoring of the bottle circumferentially around the bottle. Once scored, the bottle is then impinged by a tapping device to finish the separation of the bottle along the score line. Other techniques have also developed, including applying sources of hot and/or cold to the score line to effectuate the class separation.

Indeed, bottle cutting jigs have been developed to make bottle cutting easier, less dangerous, and less expensive for users, especially hobbyists. FIG. 1 illustrates a popular, highly effective, and well-known bottle cutter. While the prior art bottle cutter shown in FIG. 1 can effectively and efficiently score a bottle for separation of the same, there are some notable drawbacks. First, it may be difficult to provide sufficient pressure of the blade against the bottle during scoring of the same. The score line should be relatively deep; the deeper the score line, the easier to separate the bottle along the score line while minimizing shattering or breakage of the bottle around the score line. However, the blade is held against the bottle via a spring, in the prior art illustrated in FIG. 1. If the spring is not sufficient, the score line will likely be weak or non-existent, making the separating of the bottle very difficult if not impossible to do cleanly. A need, therefore, exists for an improved bottle cutting apparatus. Specifically, a need exists for an improved bottle cutting apparatus that provides sufficient pressure on the blade to ensure that the score line imparted is sufficiently deep to effectuate clean separation of the glass.

Ideally, the score line should wrap around the exterior surface of the bottle circumferentially and meets at the end of the score line exactly where it started. Thus, when separated, the score line provides a clean break around the bottle. In many bottle cutters, however, it may be particularly difficult to control the score line to ensure that it meets exactly where it started. A need, therefore, exists for an improved bottle cutting apparatus that imparts a score line that effectively wraps circumferentially around an entirety of the bottle. Moreover, a need exists for an improved bottle cutting apparatus that allows the score line to effectively meet back where it started so that there is no gap when attempting to separate the glass along the score line.

Moreover, typical bottle cutter jigs are designed for a small number of bottle sizes—typically, standard wine-bottle sizes. This is so because oftentimes the components of the bottle cutting jig are stationary and immovable, and as such only certain sized bottles may be placed within the jig for cutting the same. However, it may be desirable to be able to score any size or shape bottle. Typical heretofore known bottle cutters that do allow for movement of elements to accommodate different sized bottles are typically difficult to use and do not provide effective scoring of the bottles. A need, therefore, exists for an improved bottle cutting apparatus that may accommodate different sized and shaped bottles. More specifically, a need exists for an improved bottle cutting apparatus having modular and easily movable elements that can be easily configured to accommodate the differences in sizes and shapes of bottles scored therein.

SUMMARY OF THE INVENTION

The present invention relates to bottle cutter apparatuses, systems and methods of using the same. Specifically, the bottle cutter apparatuses comprise a stage module for holding a bottle and a cutting module comprising a rotatable arm having a blade thereon for scoring a glass bottle, or any glass tubular or cylindrical item. The stage module and the cutting module comprise elements that are movable, thereby accommodating different sized bottles thereon for precise scoring with the blade.

To this end, in an embodiment of the present invention, a bottle cutting apparatus is provided. The bottle cutting apparatus comprises: A bottle cutting apparatus comprising: a stage module and a cutting module, wherein the stage module comprises a platform comprising a first longitudinal bar and a second longitudinal bar, the first and second longitudinal bars disposed parallel and spaced apart from each other, wherein the first and second longitudinal bars provide a space for a bottle to rest thereon, wherein the cutting module comprises first and second masts and a crossbeam therebetween, and a rotatable arm disposed on the crossbeam, wherein the arm comprises a downwardly positioned blade configured to engage a bottle resting on the first and second longitudinal bars.

In an embodiment, the bottle cutting apparatus further comprises a first roller on the first longitudinal bar and a second roller on the second longitudinal bar, wherein the first and second rollers provide surfaces for a bottle to rest thereon.

In an embodiment, the platform comprises a plurality of cells, and further wherein the first and second longitudinal bars each have a pair of legs, wherein each leg of the pairs of legs has a terminal end that fits snugly within respective cells on the platform.

In an embodiment, the arm is movable along and in the direction of the crossbeam.

In an embodiment, the blade is movable to multiple positions on the arm.

In an embodiment, the arm is positioned to extend from a side of the longitudinal bars such that the arm extends perpendicular to the longitudinal bars.

In an embodiment, the arm is positioned to extend from a side of the longitudinal bars such that the arm extends parallel to the longitudinal bars.

In an embodiment, the vertical height of the crossbeam is adjustable.

In an embodiment, the bottle cutting apparatus further comprises a level on the arm.

In an embodiment, a system is provided. The system comprises the bottle cutting apparatus, and a glass bottle disposed on the first and second longitudinal bars.

In an alternate embodiment of the present invention, a method of scoring a glass bottle is provided. The method comprises the steps of: providing a bottle cutting apparatus comprising: a stage module and a cutting module, wherein the stage module comprises a platform comprising a first longitudinal bar and a second longitudinal bar, the first and second longitudinal bars disposed parallel and spaced apart from each other, wherein the first and second longitudinal bars provide a space for a bottle to rest thereon, wherein the cutting module comprises first and second masts and a crossbeam therebetween, and a rotatable arm disposed on the crossbeam, wherein the arm comprises a downwardly positioned blade configured to engage a bottle resting on the first and second longitudinal bars; positioning a glass bottle on top of the first and second longitudinal bars; rotating the arm and positioning the blade on the surface of the glass bottle; rotating the glass bottle; and scoring the glass bottle with the blade by pressing down on the arm and engaging the blade with a surface of the glass bottle.

In an embodiment, the method further comprises the step of: moving the longitudinal bars to different positions on the platform.

In an embodiment, the method further comprises the step of: moving the arm along the crossbeam.

In an embodiment, the method further comprises the step of: adjusting the vertical height of the crossbeam.

In an embodiment, the method further comprises the steps of: providing a level on the arm; and adjusting the vertical height of the crossbeam so that the arm extends horizontally from the crossbeam based on the level when the blade is resting on a surface of the glass bottle.

In an embodiment, the method further comprises the step of: moving the blade to a different position on the arm.

In an embodiment, the method further comprises the step of: pressing down on the handle when scoring the glass bottle with the blade.

In an embodiment, the arm is positioned to extend from a side of the longitudinal bars such that the arm extends perpendicular to the longitudinal bars.

In an embodiment, the arm is positioned to extend from a side of the longitudinal bars such that the arm extends parallel to the longitudinal bars.

In an embodiment, the method further comprises the step of: adjusting the position of the longitudinal bars on the platform to accommodate different sized bottles.

It is, therefore, an advantage and objective of the present invention to provide an improved bottle cutting apparatus.

Specifically, it is an advantage and objective of the present invention to provide an improved bottle cutting apparatus that provide sufficient pressure on the blade to ensure that the score line imparted is sufficiently deep and clean to effectuate clean separation of the glass.

In addition, it is an advantage and objective of the present invention to provide an improved bottle cutting apparatus that imparts a score line that effectively wraps around an entirety of the bottle.

Moreover, it is an advantage and objective of the present invention to provide an improved bottle cutting apparatus that allows the score line to effectively meet back where it started so that there is no gap when attempting to separate the glass along the score line.

Further, it is an advantage and objective of the present invention to provide an improved bottle cutting apparatus that may accommodate different sized and shaped bottles.

More specifically, it is an advantage and objective of the present invention to provide an improved bottle cutting apparatus having modular and easily movable elements that can be easily configured to accommodate the differences in sizes and shapes of bottles scored therein.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION OF THE PRESENTLY PREFERRED EMBODIMENTS

The present invention relates to bottle cutter apparatuses, systems and methods of using the same. Specifically, the bottle cutter apparatuses comprise a stage module for holding a bottle and a cutting module comprising a rotatable arm having a blade thereon for scoring a glass bottle, or any glass tubular or cylindrical item. The stage module and the cutting module comprise elements that are movable, thereby accommodating different sized bottles thereon for precise scoring with the blade.

Figure 4:
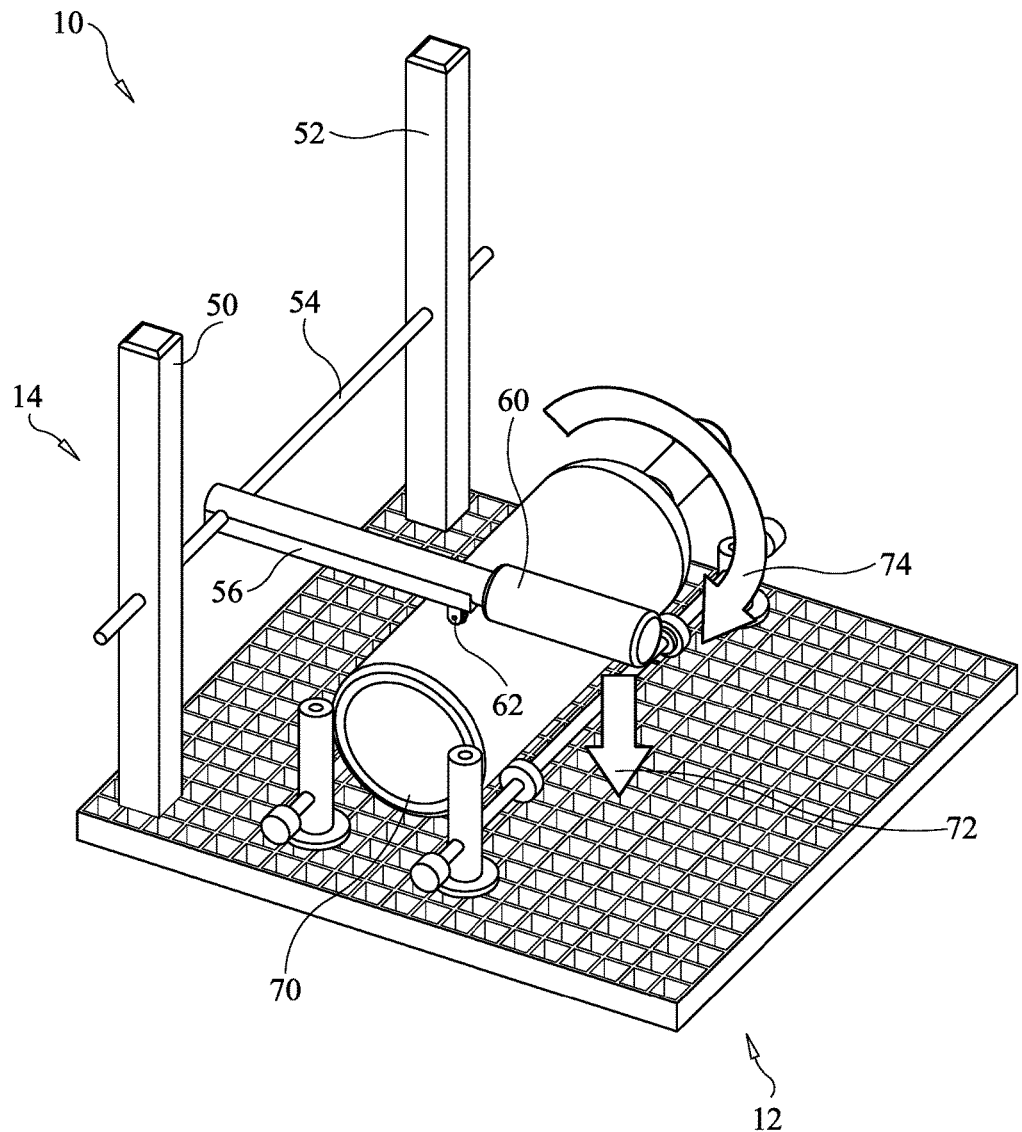
FIG. 4 illustrates a perspective view of a bottle cutting apparatus including an arm with a blade engaged with a bottle to score the same in an embodiment of the present invention.

Now referring to the drawings, wherein like numerals refer to like parts, a bottle cutting apparatus 10 is illustrated in an embodiment of the present invention. The bottle cutting apparatus 10 comprises a stage module 12 for holding a bottle thereon (as illustrated in FIG. 4) and a cutting module 14 for scoring the bottle held thereon with a glass cutting blade. Each of these modules is described in further detail below.

The stage module 12 comprises several elements allowing a bottle or other tubular glass item to be placed thereon for scoring. Preferably, the stage module 12 comprises a first longitudinal bar 20 and a second longitudinal bar 22 disposed in parallel arrangement, providing a place to rest a bottle thereon for scoring the same. The first longitudinal bar 20 may comprise a first pair of rollers 24, 26 and the second longitudinal bar 22 may comprise a second pair of rollers 28, 30, each preferably of an elastomeric material that may hold the bottle thereon and each may further freely spin on the first and second longitudinal bars 20, 22, respectively, when the bottle disposed thereon also spins, as described in more detail below The first longitudinal bar 20 may further comprise a first post 32 and a second post 34 disposed roughly at terminal ends of the first longitudinal bar 20, and may extend perpendicularly downwardly to rest on or within a platform 40. Likewise, second longitudinal bar 22 may further comprise a first post 36 and a second post 38 disposed roughly at terminal ends of the second longitudinal bar 22, and may also extend perpendicularly downwardly to rest on or within the platform 40. Second post 34 of the first longitudinal bar 20 and second post 38 of the second longitudinal bar 22 may have elements 39, 41, respectively, that extend upwardly, and provide a backrest for a bottle disposed on the longitudinal bars, as illustrated in FIG. 4.

The platform 40 may preferably be a grid having cells 42 therein disposed over a surface of the platform 40. The platform may be made from any material, but preferably plastic. The cells 42 may be sized and shaped to receive the posts 32, 34, 36, 38 of the first and second longitudinal bars 20, 22, respectively. Thus, the posts 32, 34, 36, 38 may be held in placed snugly via friction within the cells 42 at desired locations, but may further be removable and moved on the platform 40 into any desired configuration. This may be useful to change the spacing between the parallel first and second longitudinal bars, as illustrated and described in more detail with reference to FIG. 5.

The posts 32, 34, 36, 38 may have limiting pads 44 disposed thereon that limit the depth to which the posts 32, 34, 36, 38 may be disposed within the cells 42, thereby allowing the posts 32, 34, 36, 38 to be disposed at the same depth. This may ensure that the first and second longitudinal bars 20, 22 are positioned correctly, such as, for example, level to provide an adequate place to position the bottle thereon for scoring.

Figure 1:
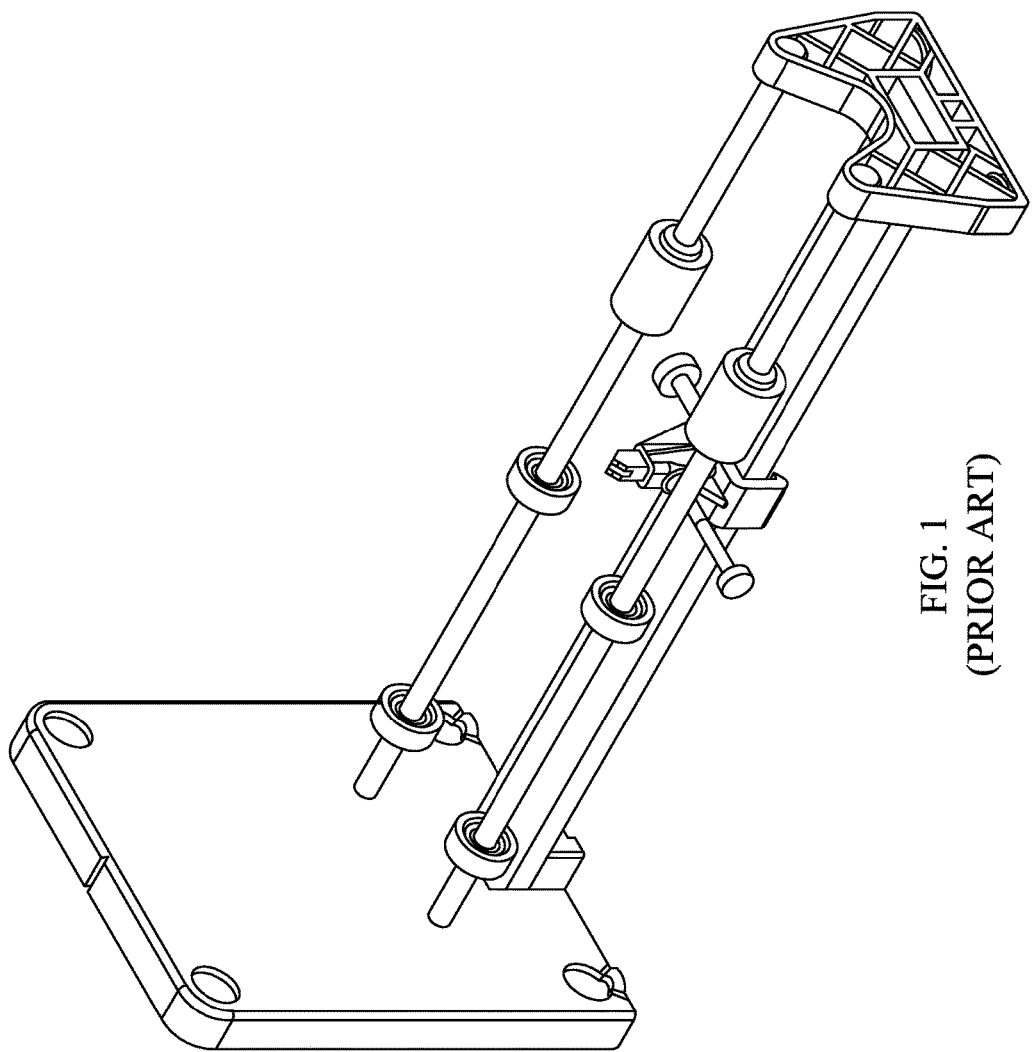
FIG. 1 illustrates a prior art bottle cutting apparatus.
Figure 2:
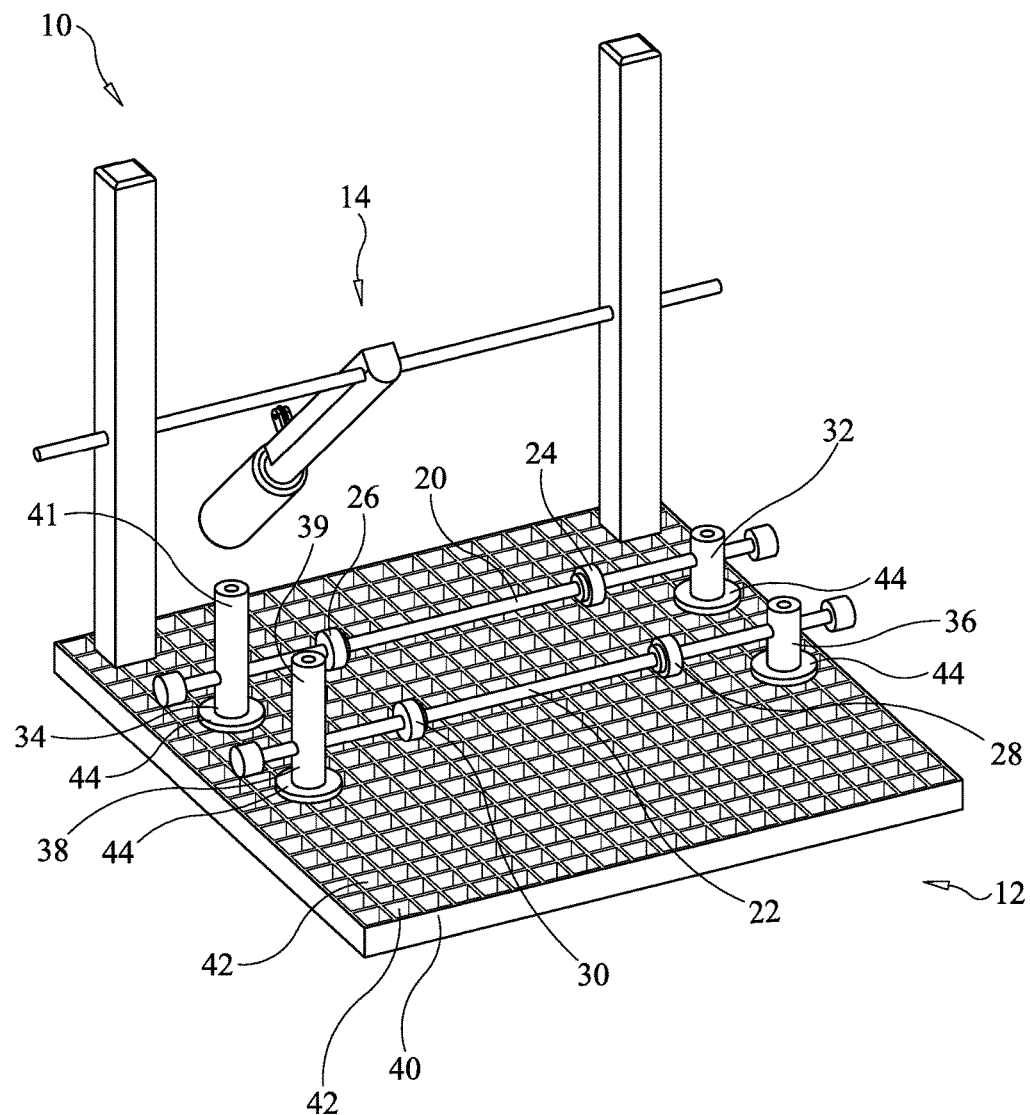
FIG. 2 illustrates a perspective view of a bottle cutting apparatus in an embodiment of the present invention.
Figure 3:
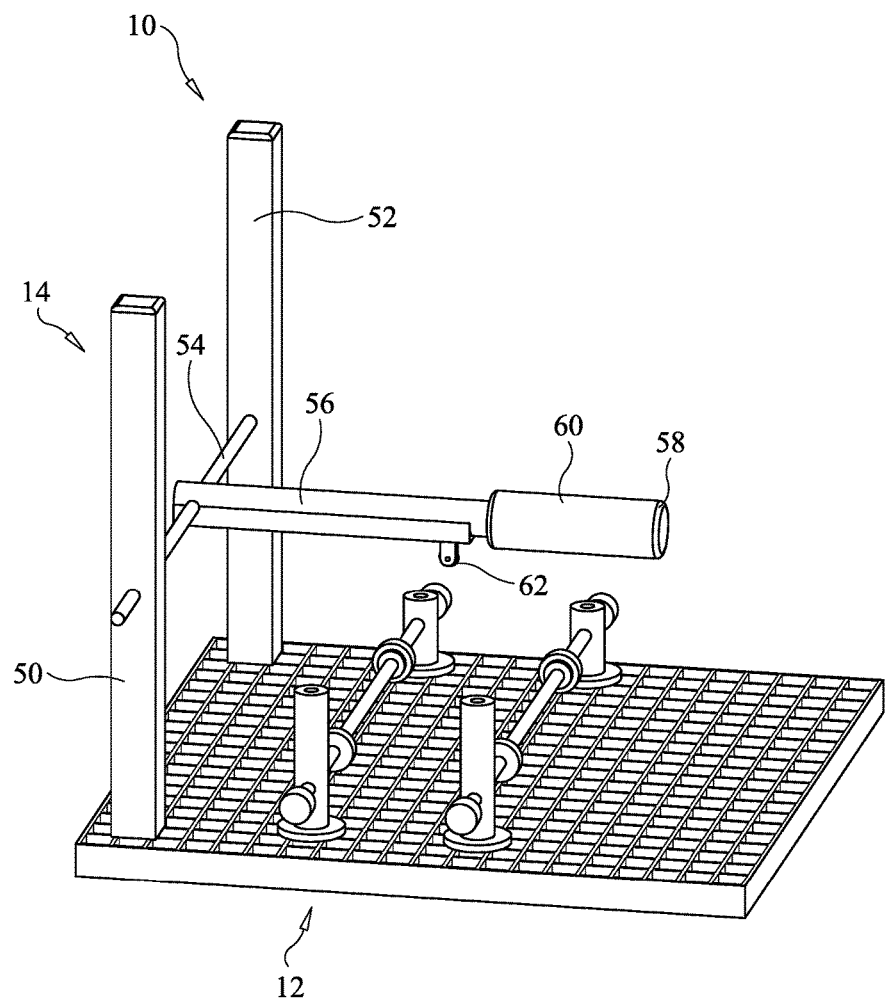
FIG. 3 illustrates a side view of a bottle cutting apparatus with a blade in an engaged position in an embodiment of the present invention.

FIG. 3 illustrates a side view of the bottle cutting apparatus 10 in an embodiment of the present invention. Specifically, the cutting module 14 is illustrated in detail, comprising a first mast 50 and a second mast 52 disposed in spaced apart parallel position to each other, and further positioned adjacent the stage module 12. First and second masts 50, 52 may be connected to the platform 40 at bottoms thereof, either permanently or removable. Specifically, the first and second masts 50, 52 may each have terminal ends that may be either bolted, glued or otherwise permanently disposed on the platform 40, or may have terminal ends that frictionally fit within cells 42 to be removable from the same to move the first and second masts 50, 52 around the platform 40 as desired.

A crossbeam 54 may extend between the first and second masts 50, 52, and an arm 56 may extend from the crossbeam 54. The arm 56 may be rotatably connected to the crossbeam 54 so that the arm 56 may move arcuately around the crossbeam 54 so that a terminal end 58 of the arm 56 may move upwardly or downwardly. The terminal end 58 of the arm 56 may comprise a handle 60 for gripping and pushing the same by a user thereof. Moreover, the arm 56 may further comprise a downwardly extending blade 62 at a position along the underside of the arm 56. The blade 62 may engage a bottle that is positioned therebeneath on the stage module 12, as described in FIG. 4. Because the arm 56 extends from the crossbeam 54 that extends from the first and second masts 50, 52 that is positioned adjacent the stage module 14, the arm 56 extends laterally across the bottle and the cutting edge of the blade 62 is positioned in line with the arm 56.

The arm 56 may further be movable along the crossbeam 54 to any position desirable. Thus, the blade 62 may be positioned in any location to score a bottle positioned therebeneath at any spot on the body of the bottle. As illustrated in FIG. 4, a bottle 70 is positioned on the stage module 12, resting on the rollers 24, 26, 28, 30 and pressed against post extensions 39 and 41. The arm 56 may be disposed in a position to align the blade 62 to a specific spot on the body of the bottle 70 to provide a circumferential score line to the bottle 70 when pressed thereon. Thus, the arm 56 may be pushed downwardly (as illustrated via arrow 72) by a user pushing down on the handle 60, pressing the blade 62 into the surface of the bottle 70. The bottle may be rotated either clockwise or counterclockwise by spinning the same on the rollers 24, 26, 28, 30, (as illustrated via arrow 74) and while pushing downwardly on the handle 60, a score line may be impressed into the surface of the bottle 70. Because the bottle 70 is positioned against post extensions 39, 41, the bottle may be easily held in position as it rotates, ensuring that the score line meets where it began when the bottle rotates a full 360°.

Figure 5:
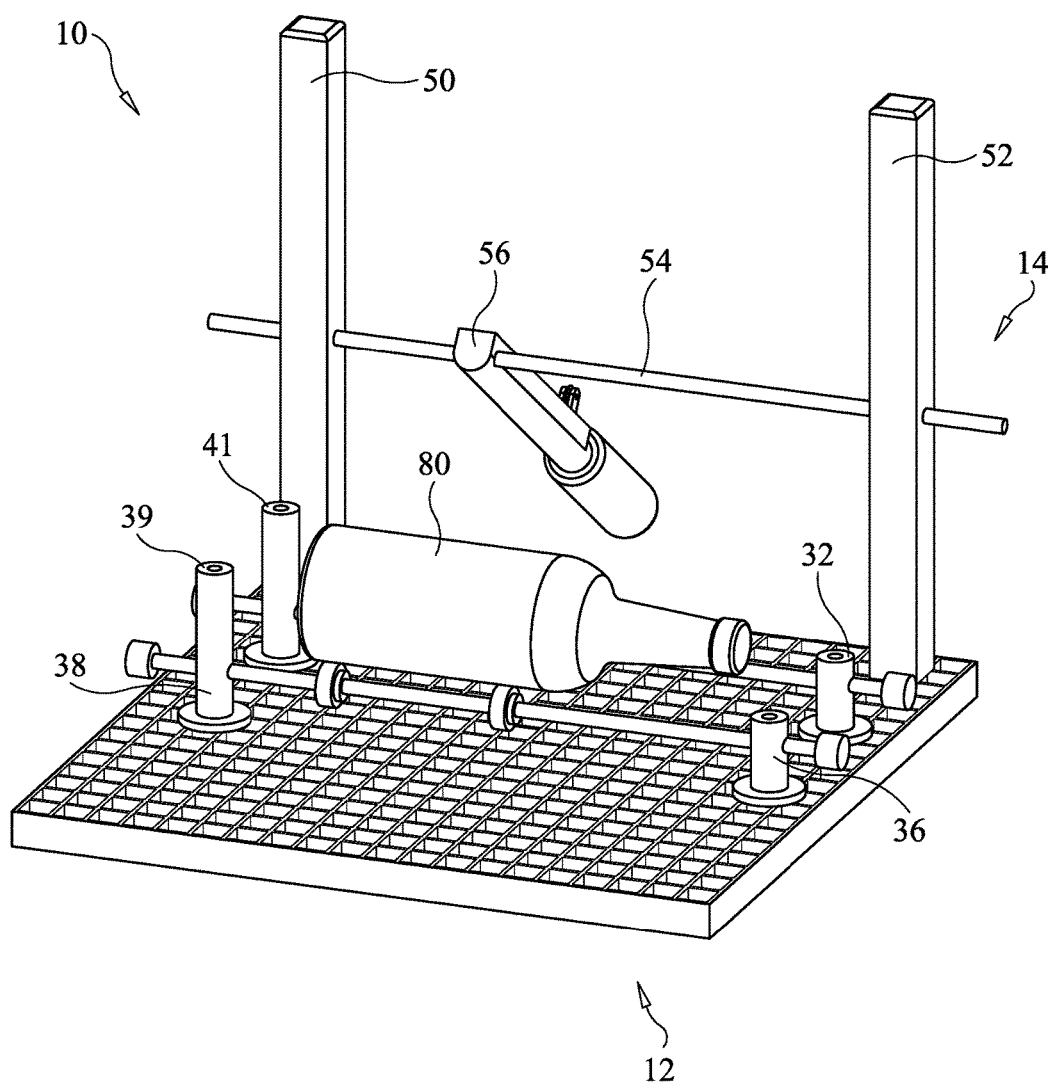
FIG. 5 illustrates a perspective view of a bottle cutting apparatus having a relatively smaller bottle disposed thereon in an embodiment of the present invention.

As mentioned above, the various components of the bottle cutting apparatus 10 may be movable so as to score different sized bottles. Specifically, as described previously, posts 32, 34, 36, 38 may be removed and moved to any position on the platform 40 to accommodate different sized bottles by pushing the posts 32, 34, 36, 38 into alternate cells in the platform 40. In the embodiment shown in FIG. 5, the longitudinal bars 20, 22 may be moved closer together to accommodate a relatively smaller sized bottle 80 thereon, as shown in FIG. 5. Moreover, the rollers 24, 26, 28, 30 may move along the first and second longitudinal bars 20, 22 to any desired position on the bars 20, 22. Likewise, the arm 56 may move along the crossbeam 54 so as to score the bottle at any location, as described above. Moreover, the blade 62 may be moved and repositioned along an underside of the arm 56 to ensure that the blade is positioned directly centrally on the side of the bottle positioned therebeneath.

Figure 6:
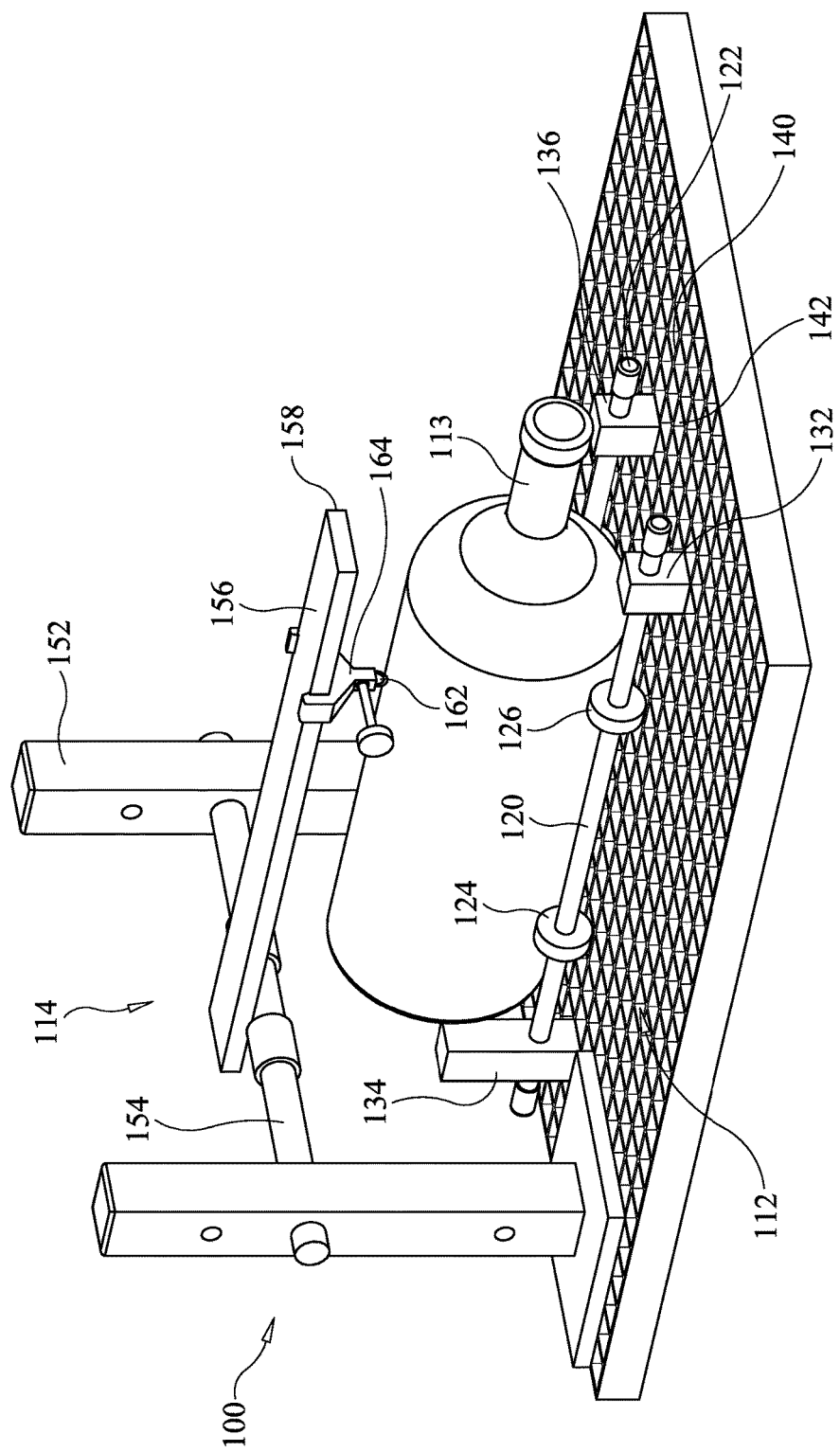
FIG. 6 illustrates a perspective view of a bottle cutting apparatus in an alternate embodiment of the present invention.
Figure 7:
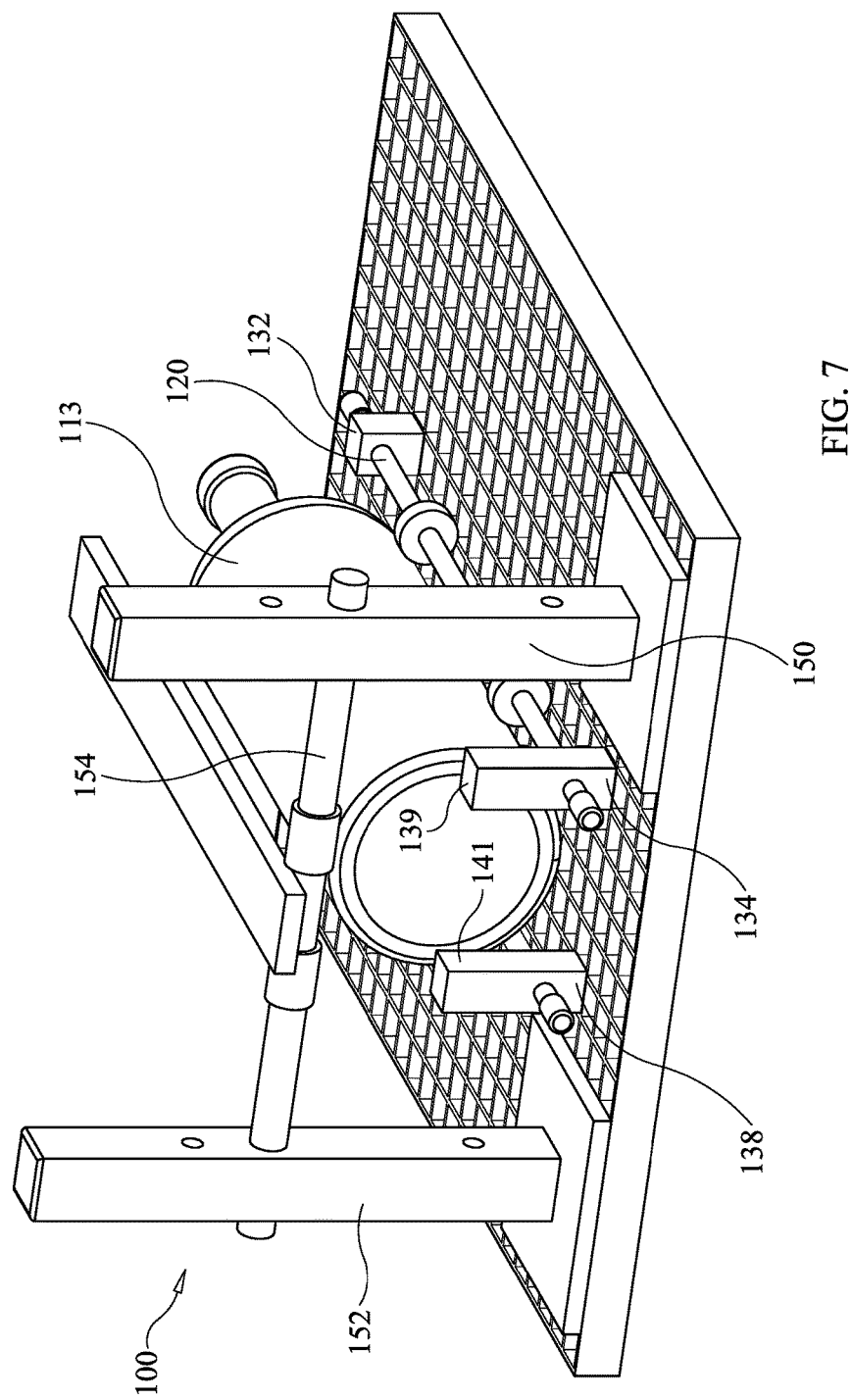
FIG. 7 illustrates a side perspective view of a bottle cutting apparatus in an alternate embodiment of the present invention.

In an alternate embodiment of the present invention, illustrated in FIGS. 6 and 7, a bottle cutting apparatus 100 is illustrated in an embodiment of the present invention. The bottle cutting apparatus 100 comprises a stage module 112 for holding a bottle 113 thereon and a cutting module 114 for scoring the bottle held thereon with a glass cutting blade. Each of these modules is described in further detail below.

The stage module 112 comprises several elements allowing a bottle or other tubular glass item to be placed thereon for scoring. Preferably, the stage module 112 comprises a first longitudinal bar 120 and a second longitudinal bar 122 disposed in parallel arrangement, providing a place to rest the bottle 113 thereon for scoring the same. The first longitudinal bar 120 may comprise a first pair of rollers 124, 126 and the second longitudinal bar 122 may comprise a second pair of rollers (not shown), each preferably of an elastomeric material that may hold the bottle thereon and each may further freely spin on the first and second longitudinal bars 120, 122, respectively, when the bottle disposed thereon also spins, as described in more detail below The first longitudinal bar 120 may further comprise a first post 132 and a second post 134 disposed roughly at terminal ends of the first longitudinal bar 120, and may extend perpendicularly downwardly to rest on or within a platform 140. Likewise, second longitudinal bar 122 may further comprise a first post 136 and a second post 138 (as illustrated in FIG. 7) disposed roughly at terminal ends of the second longitudinal bar 122, and may also extend perpendicularly downwardly to rest on or within the platform 140. Second post 134 of the first longitudinal bar 120 and second post 138 of the second longitudinal bar 122 may have elements 139, 141, respectively, that extend upwardly, and provide a backrest for a bottle disposed on the longitudinal bars, as illustrated in FIG. 7.

The platform 140 may preferably be a grid having cells 142 therein disposed over a surface of the platform 140. The platform may be made from any material, but preferably plastic. The cells 142 may be sized and shaped to receive the posts 132, 134, 136, 138 of the first and second longitudinal bars 120, 122, respectively. Thus, the posts 132, 134, 136, 138 may be held in placed snugly via friction within the cells 142 at desired locations, but may further be removable and moved on the platform 140 into any desired configuration. This may be useful to change the spacing between the parallel first and second longitudinal bars.

The cutting module 114 comprises a first mast 150 and a second mast 52 disposed in spaced apart parallel position to each other and behind the stage module 112, as opposed to adjacent the stage module 12, as illustrated with reference to FIGS. 1-5 and described above. First and second masts 150, 152 may be connected to the platform 140 at bottoms thereof, either permanently or removable. Specifically, the first and second masts 150, 152 may each have terminal ends that may be either bolted, glued or otherwise permanently disposed on the platform 140, or may have terminal ends that frictionally fit within cells 142 to be removable from the same to move the first and second masts 150, 152 around the platform 140 as desired.

A crossbeam 154 may extend between the first and second masts 150, 152, and an arm 156 may extend from the crossbeam 154. The arm 156 may be rotatably connected to the crossbeam 154 so that the arm 156 may move arcuately about the crossbeam 154 so that a terminal end 158 of the arm 156 may move upwardly or downwardly. The terminal end 158 of the arm 156 may comprise a handle (not shown) for gripping and pushing the same by a user thereof. Moreover, the arm 156 may further comprise a downwardly extending blade 162 at a position along the underside of the arm 156. The blade 162 may engage the bottle 113 that is positioned therebeneath on the stage module 112 and score the same when the arm 156 is pushed by a user and the blade 162 is pressed into the glass of the bottle 113. The bottle 113 is then rotated, allowing the score created by the blade 162 to form a circumferential line around the outside of the bottle 113.

The blade may extend from an adjustable bracket 164 that may be tightened on arm 156 when a desired position of the blade is reached by a user, or loosened and moved when a different position for the blade 162 is desired by the user. A guide or metric may be provided on a top surface of the arm 156 that may provide measurements so that the blade 162 may be precisely positioned on the arm 156 as desired by the user. Because the arm extends from the crossbeam 154 that extends from the first and second masts 150, 152, which is positioned behind the stage module 14, the cutting edge of the blade 162 is perpendicular to the arm 156. Once the blade 162 is locked down via the bracket 164, the blade 162 cuts a perfect or near perfect circumference around the bottle 113, without the scoreline spiraling due to the face of the bottle being angled, and the scoreline may end at the same place it began when the bottle 113 is fully rotated 360°.

In an alternate embodiment, the posts 134 and 138, holding terminal ends of the rods 120, 122, may be removed and the rods 120, 122 may extend into the first and second masts 150, 152, which may be disposed more closely together. Thus, the stage module 112 and the cutting module 114 may be linked together. The first and second masts 150, 152 may act to hold the bottle 113 thereagainst and thereby prevent the bottle 113 from moving, except rotated for scoring of the same, as described above.

Figure 8:
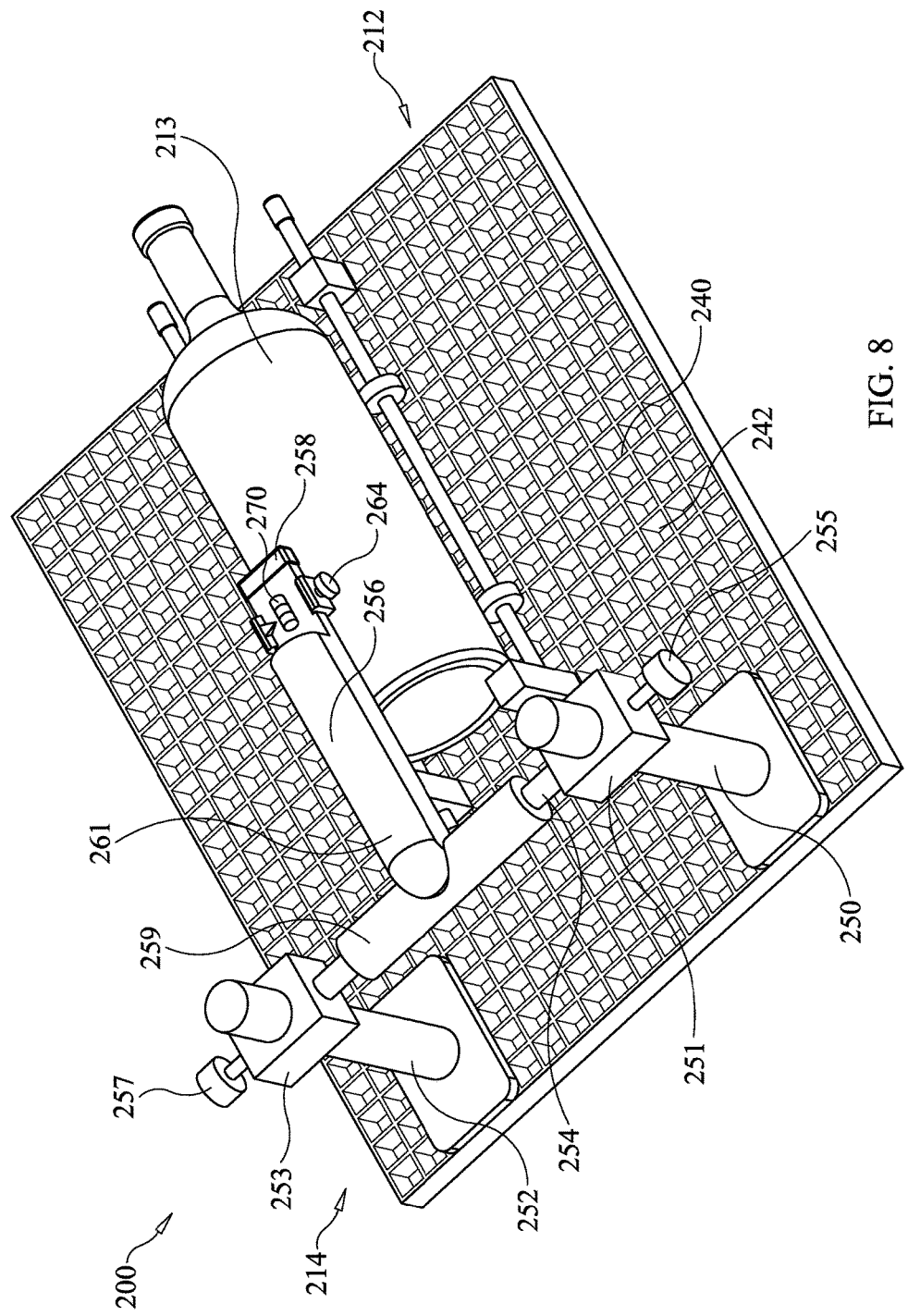
FIG. 8 illustrates a perspective view of a bottle cutting apparatus in another alternate embodiment of the present invention.
Figure 9:
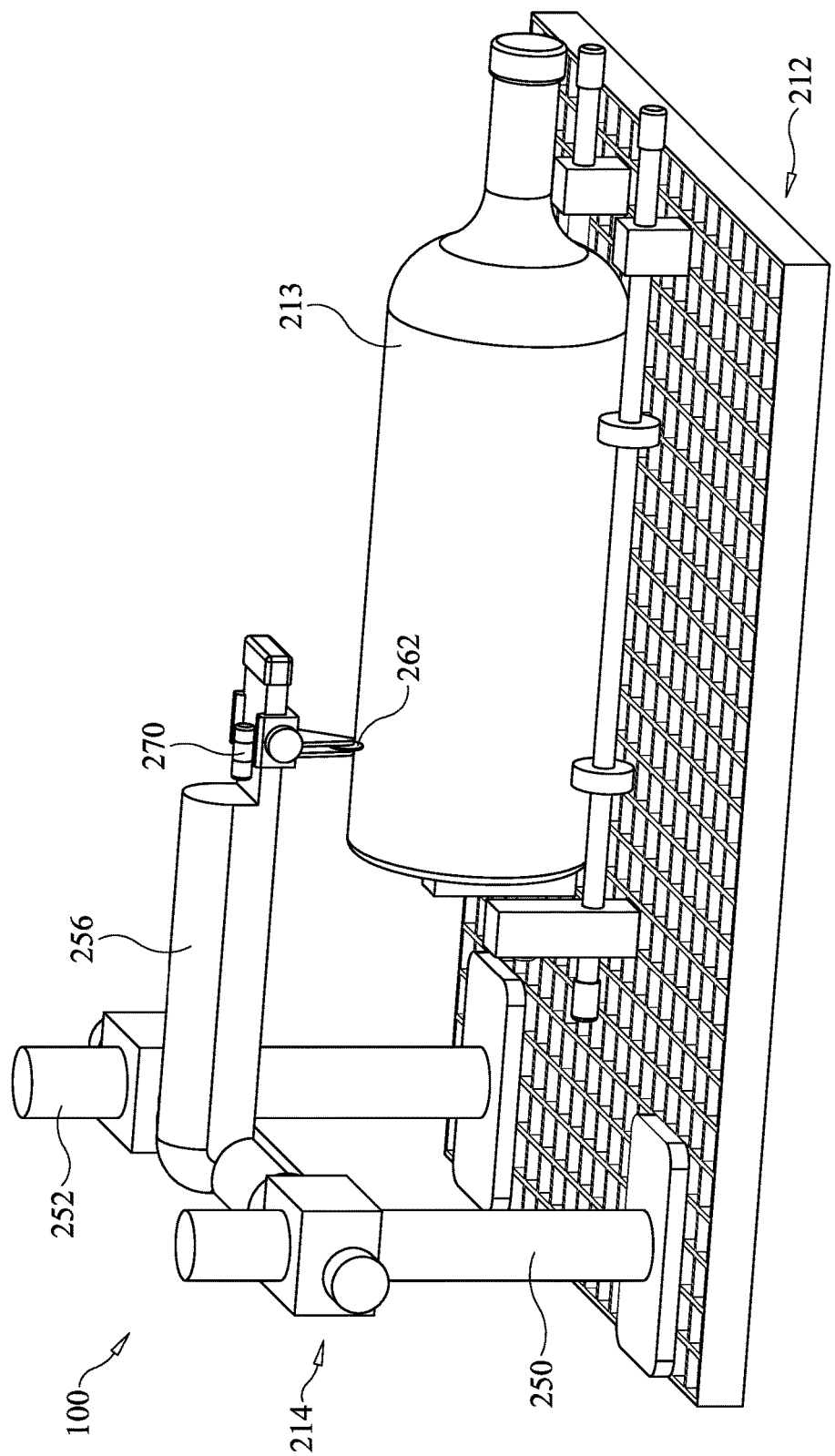
FIG. 9 illustrates a side perspective view of a bottle cutting apparatus in another alternate embodiment of the present invention.

FIGS. 8 and 9 illustrate a bottle cutting apparatus 200 in an alternate embodiment of the present invention. Bottle cutting apparatus 200 may comprise similar components as the bottle cutting apparatus 100, described above with reference to FIGS. 6 and 7, including a stage module 212 for holding a bottle 213 thereon and a cutting module 214 for scoring the bottle held thereon with a glass cutting blade. The stage module 212 is similar if not substantially identical to the stage module 112 described above with reference to FIGS. 6 and 7. The cutting module 214 is described in more detail below.

The cutting module 214 comprises a first mast 250 and a second mast 252 disposed in spaced apart parallel position to each other and behind the stage module 212 (as described above with respect to cutting module 114, described above), as opposed to adjacent the stage module 12, as illustrated with reference to FIGS. 1-5 and described above. First and second masts 250, 252 may be connected to platform 240 at bottoms thereof, either permanently or removable. Specifically, the first and second masts 250, 252 may each have terminal ends that may be either bolted, glued or otherwise permanently disposed on the platform 240, or may have terminal ends that frictionally fit within cells 242 to be removable from the same to move the first and second masts 250, 252 around the platform 240 as desired.

First mast 250 may have a first block 251 having an aperture therein to fit first mast 250 therethrough such that first block 251 is slidably disposed on first mast 250. The first block 251 may have a first tightening screw 255 disposed therein for tightening the first block 251 onto the first mast 250 at any position on the first mast 250. Likewise, second mast 252 may have a second block 253 having an aperture therein to fit second mast 252 therethrough such that second block 253 is slidably disposed onto second mast 252. The second block 253 may have a second tightening screen 257 disposed therein for tightening the second block 253 onto the second mast 252 at any position on the second mast 252. A crossbeam 254 may extend from and between the first and second blocks 251, 253, thereby extending between first and second masts 250, 252. Because the crossbeam 254 extends from and between the first and second blocks 251, 253, the height of the crossbeam 254 may be adjusted by sliding the first and second blocks 251, 253 up or down on the first and second masts 250, 252, respectively, and tightening thereon with the tightening screws 255, 257 to place the vertical position of the crossbeam 254 where desired.

An arm 256 may extend from the crossbeam 254. The arm 256 may rotatably rest on the crossbeam 254 or otherwise be rotatably connected to the crossbeam 254 via rotatable connector 259 so that the arm 256 may move arcuately about the crossbeam 254 so that a terminal end 258 of the arm 256 may move upwardly or downwardly. Stops (not shown) may be disposed on the crossbeam 254 to hold the rotatable connector 259 in place on the crossbeam 254, thereby preventing lateral movement of the arm 256 on the crossbeam 254. The arm 256 may comprise a handle 261 for gripping and/or pushing the same by a user thereof.

Moreover, the arm 256 may further comprise a downwardly extending blade 262 at a position along the underside of the arm 256. The blade 262 may engage the bottle 213 that is positioned therebeneath on the stage module 212 and score the same when the arm 256 is pushed by a user and the blade 262 is pressed into the glass of the bottle 213. The bottle 213 is then rotated, allowing the score created by the blade 262 to form a circumferential line around the outside of the bottle 213.

The blade 262 may extend from an adjustable bracket 264 that may be tightened on arm 256 when a desired position of the blade is reached by a user, or loosened and moved when a different position for the blade 262 is desired by the user. As described above with reference to bottle cutter apparatus 100, a guide or metric (not shown) may be provided on a top surface of the arm 256 that may provide measurements so that the blade 262 may be precisely positioned on the arm 256 as desired by the user. In addition, a level bubble 270 may be positioned on the arm 256 so that the arm may extend precisely horizontally or at least close to horizontal from the crossbeam 254 so that the blade 262 is perpendicular or at least close to perpendicular to the bottle surface, thereby maximizing the cutting of the blade 262 of the bottle surface. First, the bottle 213 may be placed on the stage module 212 and the blade on the arm may be rotated downwardly so that the blade 262 rests on the bottle surface. Next, the tightening screws 255, 257 may be loosened so that the height of the crossbeam 254 is adjusted so that the arm 256 extends horizontally from the crossbeam 254. The bubble level is utilized to ensure that the arm 256 extends horizontally or roughly horizontally from the crossbeam 254, and the tightening screws 255, 257 are then tightened to lock the crossbeam 254 and, therefore, the arm 256 into position.

Once the position of the blade 262 is locked down, the blade 262 may cut a perfect or near perfect circumference around the bottle 213, without the scoreline spiraling due to the face of the bottle being angled or due to movement of the component pieces thereof, and the scoreline may end at the same place it began when the bottle 213 is fully rotated 360°.

The various components of the present invention may each be adjustable and modular, such that the various components may be set up and utilized in any position apparent to one of ordinary skill in the arm. As described above, the crossbeam 254 may be adjusted upwardly or downwardly depending on the size of the bottle resting on the stage module 212. As noted, the position of the blade may be slid over the arm 256 and locked into position as desired. Moreover, the components of the stage module 212 may be movable and slidable such as to accommodate larger bottles, smaller bottles, non-circular bottles, or other like glass items.

It should be noted that various changes and modifications to the presently preferred embodiments described herein will be apparent to those skilled in the art. Such changes and modifications may be made without departing from the spirit and scope of the present invention and without diminishing its attendant advantages. Further, references throughout the specification to "the invention" are nonlimiting, and it should be noted that claim limitations presented herein are not meant to describe the invention as a whole. Moreover, the invention illustratively disclosed herein suitably may be practiced in the absence of any element which is not specifically disclosed herein.

We claim:

1. A bottle cutting apparatus comprising: a stage module and a cutting module, wherein the stage module comprises a platform, wherein disposed on a platform is a first longitudinal bar having a first pair of movable legs and a second longitudinal bar having a second pair of movable legs, the first and second longitudinal bars are parallel and adjustably spaced apart from each other, wherein the movable legs are positionable in different locations on the platform, and further wherein the first and second longitudinal bars provide a space for a bottle to rest thereon, wherein the cutting module comprises first and second masts and a crossbeam therebetween, and a rotatable arm disposed on the crossbeam, wherein the arm comprises a downwardly positioned blade configured to engage a top surface of a bottle resting on its side to cut the bottle circumferentially as it rolls on the first and second longitudinal bars.

2. The bottle cutting apparatus of claim 1 further comprising:
a first roller on the first longitudinal bar and a second roller on the second longitudinal bar, wherein the first and second rollers provide a surface for a bottle to rest thereon.

3. The bottle cutting apparatus of claim 1 wherein the platform comprises a plurality of cells, and further wherein each leg of the first and second pairs of movable legs has a terminal end that fits snugly within respective cells on the platform.

4. The bottle cutting apparatus of claim 1 wherein the arm is movable along and in the direction of the crossbeam.

5. The bottle cutting apparatus of claim 1 wherein the blade is movable to multiple positions on the arm.

6. The bottle cutting apparatus of claim 1 wherein the arm has a terminal end comprising a handle.

7. The bottle cutting apparatus of claim 1 wherein the first and second longitudinal bars each comprise a vertical extension configured to hold a bottle in position on the first and second longitudinal bars.

8. The bottle cutting apparatus of claim 1 wherein each of the legs of the first and second pairs of legs comprises a limiting pad.

9. The bottle cutting apparatus of claim 1 wherein each of the first and second longitudinal bars comprises a pair of rollers.

10. A system comprising:
the bottle cutting apparatus of claim 1; and
a glass bottle disposed on the first and second longitudinal bars.

11. A method of scoring a glass bottle comprising the steps of: providing a bottle cutting apparatus comprising: a stage module and a cutting module, wherein the stage module comprises a platform, wherein disposed on a platform is a first longitudinal bar having a first pair of movable legs and a second longitudinal bar having a second pair of movable legs, wherein the movable legs are positionable in different locations on the platform, wherein the first and second longitudinal bars, are parallel and adjustably spaced apart from each other, and provide a space for a bottle to rest thereon, wherein the cutting module comprises first and second masts and a crossbeam therebetween, and a rotatable arm disposed on the crossbeam, wherein the arm comprises a downwardly positioned blade configured to engage a bottle resting on the first and second longitudinal bars; positioning a glass bottle on top of the first and second longitudinal bars; moving the arm and positioning the blade on the surface of the glass bottle; rotating the glass bottle; and scoring a top surface of the glass bottle while the bottle rests on its side to cut the bottle circumferentially with the blade by pressing down on the arm and engaging the blade with a surface of the glass bottle.

12. The method of claim 11 further comprising the steps of:

moving the first and second pairs of legs to different positions on the platform, thereby moving the first and second longitudinal bars relative to each other.

13. The method of claim 11 further comprising the step of:

moving the arm along the crossbeam.

14. The method of claim 11 wherein the glass cutting apparatus comprises a first roller on the first longitudinal bar and a second roller on the second longitudinal bar, wherein the first and second rollers provide a surface for a bottle to rest thereon.

15. The method of claim 11 wherein the platform comprises a plurality of cells, and further wherein each leg of the first and second pairs of movable legs has a terminal end that fits snugly within respective cells on the platform, the method further comprising the step of:

moving the first and second pairs of legs into different cells within the platform, thereby moving the first and second longitudinal bars relative to each other.

16. The method of claim 11 further comprising the step of:

moving the blade to a different position on the arm.

17. The method of claim 11 wherein the arm has a terminal end comprising a handle, and further comprising the step of:

pressing down on the handle when scoring the glass bottle with the blade.

18. The method of claim 11 wherein the first and second longitudinal bars each comprise a vertical extension configured to hold a bottle in position on the first and second longitudinal bars, the method further comprising the step of:

positioning the bottle against the vertical extensions on the first and second longitudinal bars.

19. The method of claim 11 wherein each of the legs of the first and second pairs of legs comprises a limiting pad.

20. The method of claim 11 wherein each of the first and second longitudinal bars comprises a pair of rollers.

* * * * *